United States Patent
Ringseth et al.

(10) Patent No.: US 8,402,450 B2
(45) Date of Patent: Mar. 19, 2013

(54) MAP TRANSFORMATION IN DATA PARALLEL CODE

(75) Inventors: Paul F. Ringseth, Bellevue, WA (US); Yosseff Levanoni, Redmond, WA (US); Weirong Zhu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 317 days.

(21) Appl. No.: 12/947,989

(22) Filed: Nov. 17, 2010

(65) Prior Publication Data

US 2012/0124564 A1    May 17, 2012

(51) Int. Cl.
G06F 9/44    (2006.01)
G06F 9/45    (2006.01)
G06F 9/46    (2006.01)

(52) U.S. Cl. ........ 717/146; 717/133; 717/136; 717/158; 717/160; 718/102

(58) Field of Classification Search .................. None
See application file for complete search history.

(56) References Cited

U.S. PATENT DOCUMENTS

| | | | | |
|---|---|---|---|---|
| 5,179,702 | A * | 1/1993 | Spix et al. ...................... | 717/146 |
| 6,026,234 | A * | 2/2000 | Hanson et al. ................. | 717/133 |
| 6,260,036 | B1 | 7/2001 | Almasi et al. | |
| 6,560,774 | B1 * | 5/2003 | Gordon et al. ................. | 717/146 |
| 6,708,331 | B1 * | 3/2004 | Schwartz ........................ | 717/160 |
| 7,171,655 | B2 * | 1/2007 | Gordon et al. ................. | 717/146 |
| 7,533,246 | B2 * | 5/2009 | Taylor ............................ | 717/136 |
| 7,800,620 | B2 | 9/2010 | Tarditi, Jr. et al. | |
| 8,245,212 | B2 * | 8/2012 | Steiner .......................... | 717/158 |
| 2008/0005547 | A1 | 1/2008 | Papakipos et al. | |
| 2009/0307674 | A1 | 12/2009 | Ng et al. | |
| 2010/0082724 | A1 | 4/2010 | Diyankov et al. | |
| 2010/0131444 | A1 | 5/2010 | Gottlieb et al. | |
| 2010/0146245 | A1 | 6/2010 | Yildiz et al. | |

OTHER PUBLICATIONS

Peter M. Kogge et al., A Parallel Algorith for the Efficient Solution of a General Class of Recurrence Equations, IEEE vol. C-22 Issue 8, Aug. 1973, [Retrieved on Aug. 29, 2012]. Retrieved from the internet: <URL: http://ieeexplore.ieee.org/stamp/stamp.jsp?tp=&arnumber=5009159> 8 Pages (786-793).*

Peiyi Tang et al., Processor Self-Scheduling for Multiple-Nested Parallel Loops , IEEE, 1986, [Retrieved on Aug. 29, 2012]. Retrieved from the internet: <URL: http://www.ualr.edu/pxtang/papers/icpp86.pdf> 8 Pages (528-535).*

John H. Reif, An optimal Parallel Algorith for Integer Sorting, Oct. 1985, [Retrieved on Aug. 29, 2012]. Retrieved from the internet: <URL: http://ieeexplore.ieee.org/stamp/stamp.jsp?tp=&arnumber=4568176> 9 Pages (496-504).*

(Continued)

*Primary Examiner* — Don Wong
*Assistant Examiner* — Anibal Rivera
(74) *Attorney, Agent, or Firm* — Zete Law, P.L.L.C.; MacLane C. Key

(57) ABSTRACT

A high level programming language provides a map transformation that takes a data parallel algorithm and a set of one or more input indexable types as arguments. The map transformation applies the data parallel algorithm to the set of input indexable types to generate an output indexable type, and returns the output indexable type. The map transformation may be used to fuse one or more data parallel algorithms with another data parallel algorithm.

20 Claims, 3 Drawing Sheets

OTHER PUBLICATIONS

Nagaraja, et al., "A Parallel Merging Algorithm And Its Implementation With Java Threads", Retrieved at << http://citeseerx.ist.psu.edu/viewdoc/download?doi=10.1.1.90.2389&rep=rep1&type=pdf >>, Proceedings of MASPLAS'01 The Mid-Atlantic Student Workshop on Programming Languages and Systems, Apr. 27, 2001, p. 15.1-15.7.

Singhai, et al., "A Parametrized Loop Fusion Algorithm for Improving Parallelism and Cache Locality", Retrieved at << http://citeseerx.ist.psu.edu/viewdoc/download;jsessionid=7CFB7671C0A7F17205BA6BDB9BA66043?doi=10.1.1.105.6940&rep=rep1&type=pdf >>, The Computer Journal, vol. 40, No. 6, 1997, p. 340-355.

Yang, et al, "Integrating Parallel Algorithm Design With Parallel Machine Models", Retrieved at << http://www.dis.eafit.edu.co/depto/documentos/p131-yang—Integrating Parallel Algorithm Design With Parallel Machine Models.pdf >>, vol. 27, No. 1, Mar. 1995, pp. 131-135.

"International Search Report", Mailed Date: May 16, 2012, Application No. PCT/US2011/058637, Filed Date: Oct. 31, 2011, pp. 8.

* cited by examiner

MAP TRANSFORMATION IN DATA PARALLEL CODE

BACKGROUND

Computer systems often include one or more general purpose processors (e.g., central processing units (CPUs)) and one or more specialized data parallel compute nodes (e.g., graphics processing units (GPUs) or single instruction, multiple data (SIMD) execution units in CPUs). General purpose processors generally perform general purpose processing on computer systems, and data parallel compute nodes generally perform data parallel processing (e.g., graphics processing) on computer systems. General purpose processors often have the ability to implement data parallel algorithms but do so without the optimized hardware resources found in data parallel compute nodes. As a result, general purpose processors may be far less efficient in executing data parallel algorithms than data parallel compute nodes.

Data parallel compute nodes have traditionally played a supporting role to general purpose processors in executing programs on computer systems. As the role of hardware optimized for data parallel algorithms increases due to enhancements in data parallel compute node processing capabilities, it would be desirable to enhance the ability of programmers to program data parallel compute nodes and make the programming of data parallel compute nodes easier.

Data parallel compute nodes generally execute designated data parallel algorithms known as kernels or shaders, for example. In order to execute multiple data parallel algorithms, significant computing overhead is typically expended to launch each data parallel algorithm. Moreover, when a data parallel compute node has a different memory hierarchy than a corresponding host compute node, additional overhead may be expended copying intermediate results of different data parallel algorithms to and from the host compute node.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A high level programming language provides a map transformation that takes a data parallel algorithm and a set of one or more input indexable types as arguments. The map transformation applies the data parallel algorithm to the set of input indexable types to generate an output indexable type, and returns the output indexable type. The map transformation may be used to fuse one or more data parallel algorithms with another data parallel algorithm.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
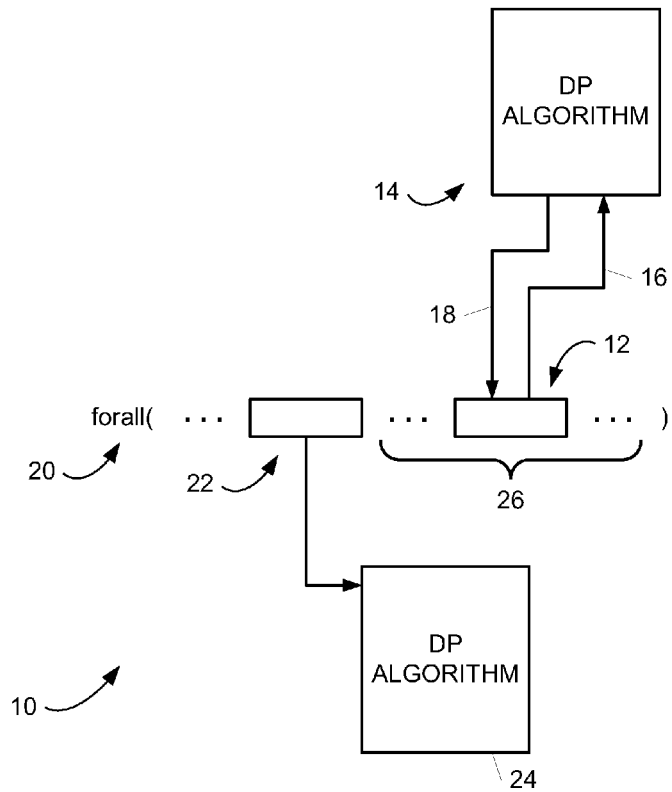
FIG. 1 is a computer code diagram illustrating an embodiment of data parallel code with a map transformation.

FIG. 1 is a computer code diagram illustrating an embodiment of data parallel (DP) code 10 with a generalized map transformation 12. Map transformation 12 takes a DP algorithm 14 and a set of one or more input indexable types as arguments, applies DP algorithm 14 to the set of input indexable types as indicated by an arrow 16 to generate an output indexable type, and returns the output indexable type as indicated by an arrow 18. Map transformation 12 may be used to fuse one or more DP algorithms 14 with another DP algorithm 24 as described in additional detail below.

As used herein, an indexable type is any data type that implements one or more subscript operators along with a rank, which is a non-negative integer, and a type which is denoted element_type. If index<N> is a type that represents N-tuples of integers (viz., any type of integral data type), an instance of index<N> is a set of N integers $\{i0, i1, \ldots, im\}$ where m is equal to N−1 (i.e., an N-tuple). An index operator of rank N takes an N-tuple instance of index<N> and associates the instance with another instance of a type called the element type where the element type defines each element in an indexable type. In one embodiment, an indexable type defines one or more of the following operators:

```
element_type operator[ ] (index_declarator);
    const element_type operator[ ] (index_declarator)
const;
    element_type& operator[ ] (index_declarator);
    const element_type& operator[ ] (index_declarator)
const;
      element_type&& operator[ ] (index_declarator); or
      const element_type&& operator[ ] (index_declarator)
const;
      where index_declarator takes the form of at least one
of:
      const index<rank>& idx;
```

-continued

```
const index<rank> idx;
index<rank>& idx;
index<rank> idx.
```

In other embodiments the operators may be functions, functors or a more general representation. An indexable type's shape is the set of index<rank> for which one of the above subscript operators is defined. An indexable type typically has a shape that is a polytope—i.e., an indexable type may be algebraically represented as the intersection of a finite number of half-spaces formed by linear functions of the coordinate axes.

Code 10 includes a sequence of instructions from a high level general purpose or data parallel programming language that may be compiled into one or more executables (e.g., DP executable 138) for execution by one or more DP optimal compute nodes (e.g., DP optimal compute nodes 121 shown in FIG. 4 and described in additional detail below). Code 10 is configured for optimal execution on one or more data parallel (DP) optimal compute nodes such as DP optimal compute nodes 121 shown in FIG. 4 and described in additional detail below.

In one embodiment, code 10 includes a sequence of instructions from a high level general purpose programming language with data parallel extensions (hereafter GP language) that form a program stored in a set of one or more modules. The GP language may allow the program to be written in different parts (i.e., modules) such that each module may be stored in separate files or locations accessible by the computer system. The GP language provides a single language for programming a computing environment that includes one or more general purpose processors and one or more special purpose, DP optimal compute nodes. DP optimal compute nodes are typically graphic processing units (GPUs) or SIMD units of general purpose processors but may also include the scalar or vector execution units of general purpose processors, field programmable gate arrays (FPGAs), or other suitable devices in some computing environments. Using the GP language, a programmer may include both general purpose processor and DP source code in code 10 for execution by general purpose processors and DP compute nodes, respectively, and coordinate the execution of the general purpose processor and DP source code. Code 10 may represent any suitable type of code in this embodiment, such as an application, a library function, or an operating system service.

The GP language may be formed by extending a widely adapted, high level, and general purpose programming language such as C or C++ to include data parallel features. Other examples of general purpose languages in which DP features may appear include Java™, PHP, Visual Basic, Perl, Python™, C#, Ruby, Delphi, Fortran, VB, F#, OCaml, Haskell, Erlang, NESL, Chapel, and JavaScript™. The GP language implementation may include rich linking capabilities that allow different parts of a program to be included in different modules. The data parallel features provide programming tools that take advantage of the special purpose architecture of DP optimal compute nodes to allow data parallel operations to be executed faster or more efficiently than with general purpose processors (i.e., non-DP optimal compute nodes). The GP language may also be another suitable high level general purpose programming language that allows a programmer to program for both general purpose processors and DP optimal compute nodes.

In another embodiment, code 10 includes a sequence of instructions from a high level data parallel programming language (hereafter DP language) that form a program. A DP language provides a specialized language for programming a DP optimal compute node in a computing environment with one or more DP optimal compute nodes. Using the DP language, a programmer generates DP source code in code 10 that is intended for execution on DP optimal compute nodes. The DP language provides programming tools that take advantage of the special purpose architecture of DP optimal compute nodes to allow data parallel operations to be executed faster or more efficiently than with general purpose processors. The DP language may be an existing DP programming language such as HLSL, GLSL, Cg, C, C++, NESL, Chapel, CUDA, OpenCL, Accelerator, Ct, PGI GPGPU Accelerator, CAPS GPGPU Accelerator, Brook+, CAL, APL, Fortran 90 (and higher), Data Parallel C, DAPPLE, or APL. Code 10 may represent any suitable type of DP source code in this embodiment, such as an application, a library function, or an operating system service.

Code 10 includes code portions designated for execution on a DP optimal compute node. In the embodiment of FIG. 1 where code 10 is written with a GP language, the GP language allows a programmer to designate DP source code using an annotation (e.g., _declspec(vector_func) . . . ) when defining a vector function. The annotation is associated with a function name (e.g., vector_func) of the vector function that is intended for execution on a DP optimal compute node. Code 10 includes a call site 20 (e.g., forall, reduce, scan, or sort) with an invocation 22 of DP algorithm 24. A vector function corresponding to a call site is referred to as a kernel or kernel function. A kernel or kernel function may call other vector functions in code 10 (i.e., other DP source code) and may be viewed as the root of a vector function call graph. A kernel function may also use types (e.g., classes or structs) defined by code 10. The types may or may not be annotated as DP source code. In other embodiments, other suitable programming language constructs may be used to designate portions of code 10 as DP source code and/or general purpose processor code. In addition, annotations may be omitted in embodiments where code 10 is written in a DP language.

Figure 2:
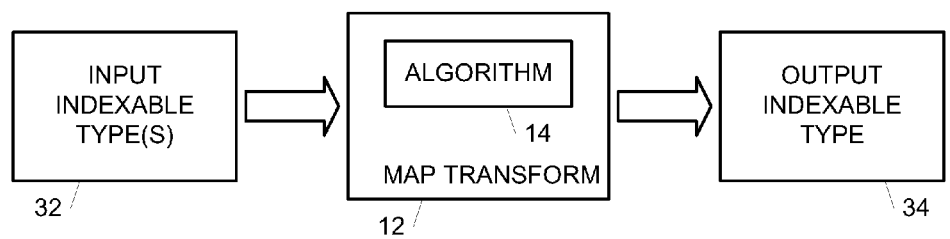
FIG. 2 is a block diagram illustrating an embodiment of applying a map transformation to set of input indexable types.

Call site 20 also includes a set of input and output arguments 26 that include one or more map transformations 12. As shown in FIG. 2, map transformation 12, when compiled and executed, takes DP algorithm 14 and a set of one or more input indexable types 32 as arguments, applies the DP algorithm to the set of input indexable types 32 as indicated by arrow 16 to generate an output indexable type 34, and returns the output indexable type 34 as indicated by arrow 18. In some embodiments, the output indexable type 34 may be the same as one of the input indexable types 32. By including map transformation 12 in the set of arguments 26 of call site 20, map transformation 12 allows DP algorithm 14, as well as other DP algorithms (not shown), to be fused with DP algorithm 24. By fusing DP algorithms 14 and 24, DP algorithms 14 and 24 are combined to form a single algorithm that may be executed on a DP optimal compute device as a single function or kernel invocation from call site 20. The combined algorithm may take advantage of enhanced spatial and temporal data locality to enhance performance.

Map transformation 12 may be expressed in any suitable way. For example, a generalized form of map transformation 12 may be expressed as:

$$\text{map}(\text{elementary\_function})(IT_1, \ldots, IT_N)$$

where elementary_function is the name of the kernel function (e.g., DP algorithm 14) that operates on the set of input indexable types $IT_1$ to $IT_N$ where N is an integer that is greater than or equal to one (e.g., input indexable types 32 shown in FIG. 2). From the set of input indexable types, map transformation 12 returns an output indexable type (e.g., output indexable type 34 shown in FIG. 2).

Additional details of the generalized form of map transformation 12 will now be described. Let $element\_type_1, \ldots,$ $element\_type_n$ be n data parallel (DP) scalar types where a DP scalar type, in one embodiment, is the transitive closure of the fundamental C++ types (cf. section 3.9.1 of C++0x working draft standard—document N3126: http://www.open-std.org/JTC1/SC22/WG21/docs/papers/2010/n3126.pdf) under the C++ POD struct operation (cf. section 9.0.9 of document N3126.) More general data types are not, however, precluded and may be used in other embodiments. These n types are also element types of n indexable types $indexable\_type_1, \ldots,$ $indexable\_type_n$. In other words, $indexable\_type_1$::element_type, ..., $indexable\_type_n$::element_type is the same as $element\_type_1, \ldots, element\_type_n$. Assume these indexable types all have the same rank N. (The notation $indexable\_type_k$ may refer to a type or it may refer to an instance of the corresponding type, however, the usage is unambiguous in context.)

Consider the function:
return_type elementary_function($element\_type_1$_ $Arg_1, \ldots, element\_type_n$_$Arg_n$).
The general form of map function 12 lifts elementary_function to act on instances of $indexable\_type_1, \ldots, indexable\_type_n$ to form an indexable type of rank N. The new indexable type becomes:
map (elementary_function)($indexable\_type_1, \ldots,$ $indexable\_type_n$)
where the index operator takes the following form.

```
ret_type operator[ ] (const <index<N>& __Index) {
    return elementary_function(indexable_type1[__Index], ...,
    indexable_typen[__Index]);
}
```

For a given rank N, a function, elementary_function, of DP scalar types that returns a DP scalar type can be lifted to act on indexable types of rank N whose element types are the DP scalar types forming the arguments of elementary_function. The lift of elementary_function forms an indexable type of rank N whose element type is the same as the return type of elementary_function. The action of the lift is through the above index operator.

The implementation of the lift will now be described with reference to one embodiment. In this embodiment, map(elementary_function) creates an instance of a class map_abstract_type. The class map_abstract_type has a function call operator that has the same number of arguments as elementary_function. The arguments of the function call operator are abstract template parameter types to allow arbitrary indexable types to be passed in, provided that the indexable types have the same element types as the corresponding argument of elementary_function and the indexable types all have the same rank. The return type of the function call operator is an indexable type map_type. Using C++0x variadic templates, the implementation of map_abstract_type takes the following form.

```
template <typename __Kernel_type>
class map_abstract_type {
public:
    //
    // simple constructor
    //
    map_abstract_type(__Kernel_type __Kernel) : m_kernel(__Kernel)
    { }
    //
    // For more information on variadic templates in C++.
    //
    // http://en.wikipedia.org/wiki/Variadic_Templates
    // http://www.generic-programming.org/~dgregor/cpp/variadic-templates.pdf
    // http://www.open-std.org/JTC1/SC22/WG21/docs/papers/2010/n3126.pdf
    //
    // This is the map-factory operator.
    //
    template <typename... __Kernel_argument_types>
        map_type<__Kernel_type, __Kernel_argument_types...>
            operator( ) (__Kernel_argument_types... __Args)
        {
            return map_type<__Kernel_type,
    __Kernel_argument_types...>(m_kernel, __Args...);
        }
    private:
        __Kernel_type m_kernel;
};
```
The following factory method map is used to create instances of map_abstract_type.
```
//
// map factory
//
template <typename __Kernel_type>
map_abstract_type<add> map(__Kernel_type __Kernel) {
    return map_abstract_type<__Kernel_type>(__Kernel);
}
```

In other words, map (elementary_function)($indexable\_type_1, \ldots, indexable\_type_n$) is an instance of map_type. The first argument (elementary_function) produces an instance of map_abstract_type and the second set of arguments ($indexable\_type_1, \ldots, indexable\_type_n$) calls the function call operator of map_abstract_type. The function call operator returns an instance of map_type that corresponds to both the first and second set of arguments.

In the implementation of map_type, the common rank 'rank' of the indexable types is determined and then the return type_Return_type of elementary_function is determined through variadic template meta programming as follows.

```
static const int rank = get_rank<__Kernel_argument_types...>::rank;
typedef decltype( declval<__Kernel_type>( )(
        declval<__Kernel_argument_types>( )::element_type... ) )
__Ret_type;
```

The typedef_Ret_type is determined by using decltype to implement a partial call of a partial instance of the type_Kernel_type with argument list formed by creating partial instances of the element_types of the indexable types formed by the template parameter pack_Kernel_argument_types. In addition, get_rank unpacks the first template argument from the parameter pack_Kernel_argument_types and returns the rank of the resulting indexable type. Also, declval<T>( ) creates a partial instance of T that is suitable for partial evaluation in decltype type deduction.

In applying map(elementary_function) to the indexable type instances, map (elementary_function)($indexable\_type_1, \ldots, indexable\_type_n$) is a map_type constructor call. The argument list ($indexable\_type_1, \ldots, indexable\_type_n$) is a function parameter pack translated to a C++ tuple 'std::tuple m_args' in order to be stored as a member of map_type. The index operator of map_type is implemented by translating m_args to a parameter pack (still named m_args for ease of exposition) using standard C++0x techniques. Then, every element of the parameter pack is evaluated at the input argument 'const index<rank>&_Index' to the index operator, which yields a parameter pack of type element_type$_1$, . . . , element_type$_n$. The parameter pack is then evaluated by elementary_function and returned. In the notation of the implementation of map_type, the index operator returns the following.

return m_kernel(m_args[_index] . . . );

In one embodiment, the full implementation takes the following form.

```
template <typename _Kernel_type, typename...
_Kernel_argument_types> class map_type {
  public:
    //
    // The typedef _Ret_type is determined by using decltype to
implement a partial call
    // of the type _Kernel_type with argument list formed by creating
partial instances
    // of the element_types of the indexable types formed by the
parameter pack
    // _Kernel_argument_types.
    //
    // get_rank works by unpacking the first template argument from the
parameter pack
    // _Kernel_argument_types and return the rank of the resulting
indexable type.
    //
    // declval<T>( ) works by creating a partial instance of T, suitable for
partial evaluation in decltype type deduction.
    //
    static const int rank = get_rank<_Kernel_argument_types...>::rank;
      typedef decltype( declval<_Kernel_type>( )(
declval<_Kernel_argument_types>( )::element_type... ) ) _Ret_type;
    //
    // constructor called from map_abstract_type
        // fill up m_args -- can't store a function parameter pack so
initialize tuple with the parameter pack
    //
    map_type(_Kernel_type _Kernel,
const _Kernel_argument_types&... _Args)
        : m_kernel(_Kernel), m_args(_Args...)
        {
        }
    //
    // basic index operator (there are actually more just like this)
    //
    _Ret_type operator[ ] (const index<rank>& _Index) {
      //
      // Create a parameter pack from the tuple m_args and evaluate
each instance
      // in the parameter pack at [_Index].
      // 'return m_kernel(m_args[_Index]...);'
      //
      return tuple_proxy<_Ret_type>(m_kernel, _Index, m_args);
    }
  private:
    std::tuple<_Kernel_argument_types...> m_args;
    _Kernel_type m_kernel;
};
```

Figure 3A:
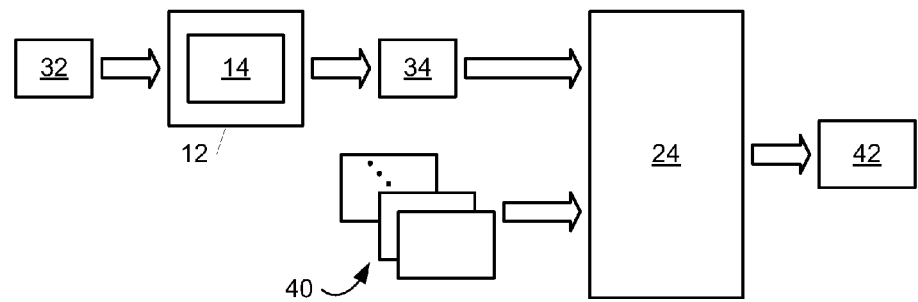
FIGS. 3A-3C are block diagrams illustrating embodiments of using a map transformation.
Figure 3B:
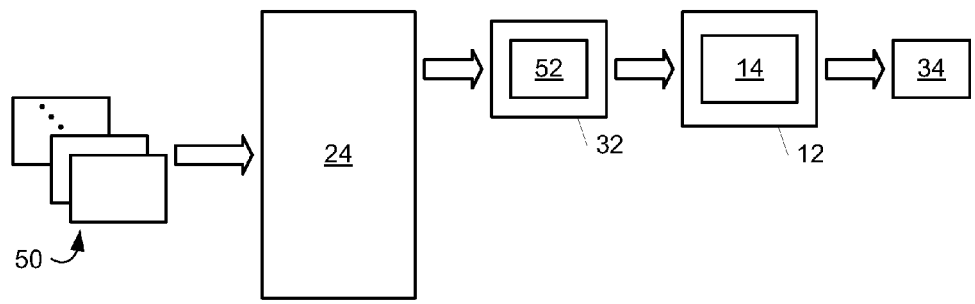
Figure 3C:
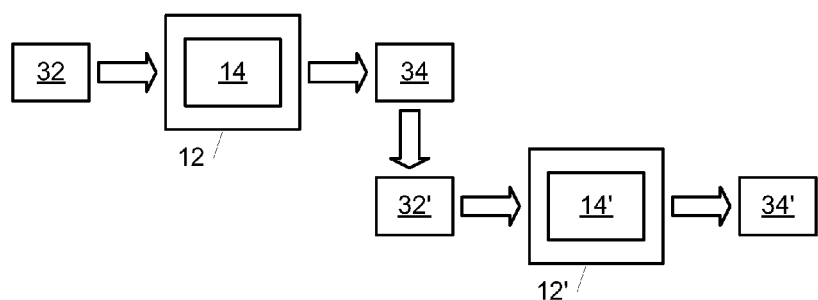

The returned indexable type of a map transformation may serve as an argument 26 to the call site kernel (e.g., DP algorithm 24) as shown in FIG. 3A, an output indexable type of the call site kernel as shown in FIG. 3B, or an argument to other map functions 12' in call site 20 as shown in FIG. 3C.

As shown in FIG. 3A, output indexable type 34 of map transformation 12 may be used as an input indexable type of DP algorithm 24 along with a set of zero or more other input indexable types 40 specified as arguments 26 in call site 20. To do so, call site 20 specifies a map transformation 12 on the set of input indexable types 32 as an argument 26. DP algorithm 24 generates output indexable type 42 from output indexable type 34 and input indexable types 40 and returns output indexable type 42. Each input indexable type 32 may undergo one or more other map transformations (not shown) prior to being provided to map transformation 12, each input indexable type 40 may also undergo one or more other map transformations (not shown) prior to being provided to DP algorithm 24, and output indexable type 42 may undergo one or more other map transformations (not shown) prior to being returned by DP algorithm 24.

As shown in FIG. 3B, an output indexable type 52 generated by DP algorithm 24 from a set of input indexable types 50 may be used as one of the set of input indexable types 32 of map transformation 12. To do so, call site 20 specifies a map transformation 12 on the set of input indexable types 32 that include output indexable type 52 of DP algorithm 24. DP algorithm 14 generates output indexable type 34 from the set of input indexable types 32 that include output indexable type 52 and returns output indexable type 34. Each input indexable type 50 may undergo one or more other map transformations (not shown) prior to being provided to DP algorithm 24, each input indexable type 32 (including indexable type 52) may also undergo one or more other map transformations (not shown) prior to being provided to map transformation 12, and output indexable type 34 may undergo one or more other map transformations (not shown) prior to being returned by map transformation 12.

FIG. 3C illustrates the use of a map transformation 12' on output indexable type 34 of map transformation 12. In particular, output indexable type 34 of map transformation 12 may be used as one of the set of one or more input indexable types 32' of map transformation 12' to generate output indexable type 34'. More generally, FIG. 3C illustrates that multiple map transformations 12 may be applied to one or more set of input indexable types 32 for each argument 26 in call site 20.

Map transformation 12 will now be illustrated with several examples. In the first example, the following code portion is defined for evaluating A*(sin(B)+exp(-C)) where A, B, and C are indexable types.

```
field<2, double> A, B, C;
//
// call-site kernel
//
auto _mxm = [=](const index<2>& idx, double& c, const field<2,
double>& arg1, const field<2, double>& arg2)->void{
    for (int k = 0; k < arg1.get_extent(1); ++k)
        c += arg1(idx[0], k)   arg2(k, idx[1]);
};
//
// map kernels
//
auto _add = [=](double x, double y)->double{
    return x + y;
};
auto _uminus = [=](double x)->double{
    return -x;
};
auto _sin = [=](double x)->double{
    return sin(x);
};
auto _exp = [=](double x)->double{
    return exp(x);
};
```

Using map transformations 12 with the generalized form noted above:

```
-C may be expressed as map(_uminus)(C);
exp(-C) may be expressed as map(_exp)(map(_uminus)(C));
sin(B) may be expressed as map(_sin)(B); and, therefore,
sin(B)+exp(-C) may be expressed as
    map(_add)(map(_sin)(B),map(_exp)(map(_uminus)(C))
```

Accordingly, the following call site may use map transformations to to fuse the kernels defined by _uminus, exp, _sin, and _add to compute A*(sin(B)+exp(-C).

```
forall(A.get_extent( ), _mxm, D, A, map(_add)(map(_sin)(B),
    map(_exp)(map(_uminus)(C))));
```

As another example, the following matrix multiplication kernel may be defined.

```
void mxm(index<2>& idx, float& c, read_only_range<field<2, float>>&
    A, read_only_range<field<2, float>>& B) {
        int max = A.get_extent(1);
        for (int k = 0; k < max; ++k)
            c += A(idx[0], k) * B(k, idx[1]);
}
void add(float& c, float a, float b) {
    c = a + b;
}
```

To compute D=(A+B)*C, the following map transformation 12 may be defined to form a first matrix addition kernel.

```
struct morph_input : public field<2, float> {
    // constructor
    morph_input(const field<2, float>& _Parent, const field<2,
        float>& _Sum)
        : field<2, float>(_Parent), m_sum(_Sum) {
    }
    //
    // index ops
    //
    const float operator[ ] (const index<2>& _Index) const {
        return m_sum[_Index] + base[_Index];
    }
private:
    float<2, float> m_sum;
};
```

Using this map transformation 12 and the above matrix multiplication kernel, the following call site may be used to compute D=(A+B)*C by fusing the matrix multiplication kernel with the first matrix addition kernel defined by the map transformation 12.

forall(D.get_grid( ), mxm, D, morph_input(A, B), C);

To compute D=A*B+C, the following map transformation 12 may be defined to form a second matrix addition kernel.

```
struct morph_output : public field<2, float> {
    // constructor
    morph_output(const field<2, float>& _Parent, const field<2,
        float>& _Sum)
        : field<2, float>(_Parent), m_sum(_Sum) {
```

-continued

```
    }
    //
    // index ops
    //
    void set_value(const index<2>& _Index, float _Value) {
        field<2, float>& base = *static_cast<field<2, float>*> (this);
        base[_Index ] = _Value + m_sum[_Index];
    }
    float& get_value(const index<2>& _Index) {
        field<2, float>& base = *static_cast<field<2, float>*> (this);
        return base[_Index ];
    }
    __declspec(property(get=get_value, put=set_value))
    float __value[ ];
    //
    // When operator[ ] is used as an rvalue, get_value is called.
    // When operator[ ] is used as an lvalue, set_value is called.
    //
    float& operator[ ] (const index<2>& _Index) {
        return __value[_Index ];
    }
private:
    float<2, float> m_sum;
};
```

Using this map transformation 12 and the above matrix multiplication kernel, the following call site may be used to compute D=A*B+C by fusing the matrix multiplication kernel with the second matrix addition kernel defined by the map transformation 12.

forall(D.get_grid( ), mxm, morph_output(D, C), A, B);

In the above examples, the index operator of morph_input:
const float operator[ ] (const index<2>& _Index) const;
returns by-value.

Whereas the index operator of morph_output:
float& operator[ ] (const index<2>& _Index);
returns by-reference (viz., return by-lvalue-reference).

When the output type of the kernel being lifted by the map transformation (i.e., morph_input or morph_output) returns by l-value reference, then the index operators of the kernel can return by l-value reference. Similarly, when the output type of the kernel being lifted by the map transformation returns by r-value reference, then the index operators of kernel can return by r-value reference. Likewise, when the output type of the kernel being lifted by the map transformation returns by-value, then the index operators of kernel can return by-value. Using template meta-programming techniques, specifically SFINAE and CRTP, the return characteristics of the lifted kernel is analyzed and the basic class which provides the implementation of the index operator is changed appropriately.

More generally, suppose the operation being encapsulated is a function:
element_type_transformation(const index<rank>& idx, element_type_Value).
Then the encapsulation indexable type for input map transformation 12 (morph_input) is as follows.

```
template <typename _Parent_type, typename _Transformer>
class byvalue_morph_input : public _Parent_type {
public:
    static const int rank = _Parent_type::rank;
    typedef typename _Parent_type::element_type element_type;
    typedef typename _Parent_type _Base;
    //
    // communication operator ctor
    //
    byvalue_morph_input(const _Parent_type& _Parent, const
```

```
__Transformer& __transformer)
    : m_transformer(__transformer), __Base(__Parent) {
}
//
// restriction operator ctor, for tiling or subset indexable types
//
template <typename __Other_parent_type>
byvalue_morph_input(const grid<rank>& __Grid, const
__Other_parent_type& __Parent)
    : m_transformer(__Parent.m_transformer), __Base(__Parent) {
}
//
// index ops
//
const element_type operator[ ] (const index<rank>& __Index) const {
    return m_transformer(__Index, base[ __Index ] );
}
private:
    __Transformer m_transformer;
};
```

For the output map transformation 12 (morph_output), the encapsulation indexable type for is as follows.

```
template <typename __Parent_type, typename __Transformer>
class byvalue_morph_output : public __Parent_type {
public:
    static const int rank = __Parent_type::rank;
    typedef typename __Parent_type::element_type element_type;
    typedef typename __Parent_type __Base;
    //
    // communication operator ctor
    //
    byvalue_morph_output(const __Parent_type& __Parent, const
__Transformer& __transformer)
        : m_transformer(__transformer), __Base(__Parent) {
    }
    //
    // restriction operator ctor, for tiling or subset indexable types
    //
    template <typename __Other_parent_type>
    byvalue_morph_output(const grid<rank>& __Grid, const
__Other_parent_type& __Parent)
        : m_transformer(__Parent.m_transformer), __Base(__Parent) {
    }
    //
    // index ops
    //
    void set_value(const index<rank>& __Index, const element_type&
__Value) {
        __Parent_type& base = *static_cast<__Parent_type*>(this);
        base[ __Index ] = m_transformer(__Index, __Value);
    }
    element_type get_value(const index<rank>& __Index) {
        __Parent_type& base = *static_cast<__Parent_type*>(this);
        return base[ __Index ];
    }
    __declspec(property(get=get_value, put=set_value))
    element_type _value[ ];
    element_type operator[ ] (const index<rank>& __Index) {
        return _value[ __Index ];
    }
private:
    __Transformer m_transformer;
};
```

With the above encapsulation indexable type, the implementation for D=(A+B)*C takes the following form.

```
template <typename __Parent_type, typename __Transformer>
byvalue_morph_input <__Parent_type, __Transformer> map(const
__Parent_type& __Parent, __Transformer __transformer) {
    return byvalue_morph_input <__Parent_type,
__Transformer>(__Parent, __transformer);
}
auto lambda_in = [=](const index<2>& idx, float fin)->float{
    return (B[idx] + fin);
};
forall(D.get_grid( ), mxm, D, map(A, lambda_in), C);
```

In this implementation form, the kernel being mapped is auto lambda_in=[=](const index<2>& idx, float fin)->float{return (B[idx]+fin);}, which is a transformation of the following elemental kernel where the purpose, of the transformation is to capture 'B' in the lambda expression.

```
auto __add = [=](float in1, float in2)->float {
    return in1 + in2;
}
```

Likewise, the implementation for D=A*B+C takes the following form.

```
template <typename __Parent_type, typename __Transformer>
byvalue_morph_output <__Parent_type, __Transformer>
map_output(const __Parent_type& __Parent, __Transformer __transformer)
{
    return byvalue_morph_output <__Parent_type,
__Transformer>(__Parent, __transformer);
}
auto lambda_out = [=](const index<2>& idx, float fin)->float{
    return (C[idx] + fin);
};
forall(D.get_grid( ), mxm, morph_output(D, lambda_out), A, B);
```

In this implementation form, the kernel being mapped is auto lambda_out=[=](const index<2>& idx, float fin)->float{return (C[idx]+fin);}, which is a transformation of the following elemental kernel where the purpose of the transformation is to capture 'C' in the lambda expression.

```
auto __add = [=](float in1, float in2)->float {
    return in1 + in2;
}
```

The lambda expressions in the above examples work by capturing all of the data that is referenced. Thus, lambda_in captures B and lambda_out captures C. In other embodiments, classes with function-call operators may also be used as long as the capture of B or C is explicit. A class whose main purpose is to expose a function-call operator is known as a functor. The implementation of C++0x lambda expressions is by compiler generated functor classes.

For performance reasons, the index operators of the morph_input indexable type classes would optimally return by-lvalue-reference. But that is conditional upon the input functor returning by-lvalue-reference. The next most optimal case is to return by-rvalue-reference, which again is conditional upon the input functor returning by-rvalue-reference. Finally, if the input functor returns by-value, then the morph input pseudo-field class returns by-value. This functionality is enabled automatically by forming the following class.

```
template <typename _Parent_type, typename _Transformer>
class morph_input : public Conditional_Base {...};
``` where Conditional_Base is one of:
- lvalue_morph_input
- rvalue_morph_input
- byvalue_morph_input depending upon the return type of the lambda expression that morph_input is specialized on.

Figure 4:
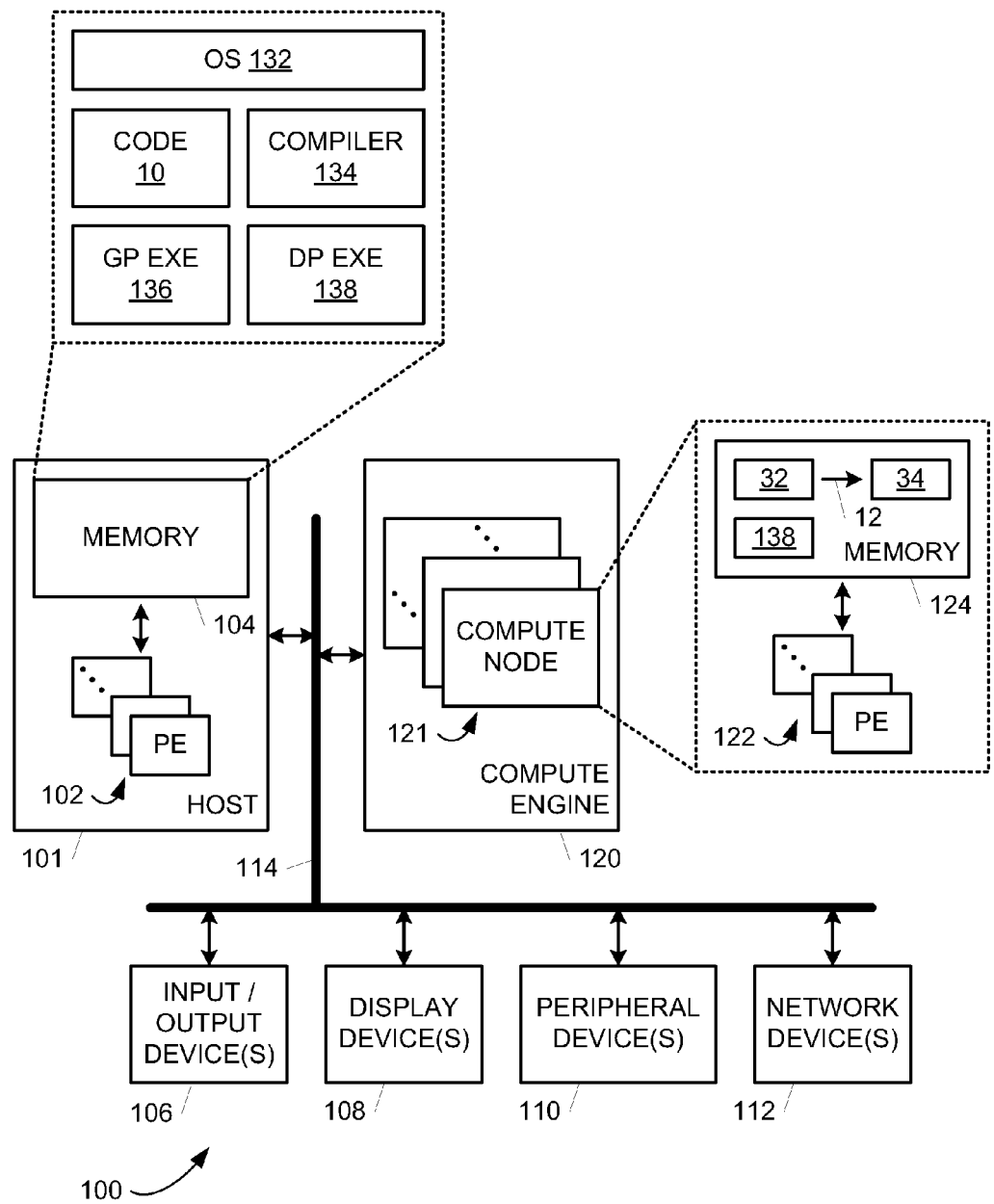
FIG. 4 is a block diagram illustrating an embodiment of a computer system configured to compile and execute data parallel code that includes a map transformation.

FIG. 4 is a block diagram illustrating an embodiment of a computer system 100 configured to compile and execute data parallel code 10 that includes a map transformation 12.

Computer system 100 includes a host 101 with one or more processing elements (PEs) 102 housed in one or more processor packages (not shown) and a memory system 104. Computer system 100 also includes zero or more input/output devices 106, zero or more display devices 108, zero or more peripheral devices 110, and zero or more network devices 112. Computer system 100 further includes a compute engine 120 with one or more DP optimal compute nodes 121 where each DP optimal compute node 121 includes a set of one or more processing elements (PEs) 122 and a memory 124 that stores DP executable 138.

Host 101, input/output devices 106, display devices 108, peripheral devices 110, network devices 112, and compute engine 120 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a smart phone, a personal digital assistant (PDA), a mobile telephone, and an audio/video device. The components of computer system 100 (i.e., host 101, input/output devices 106, display devices 108, peripheral devices 110, network devices 112, interconnections 114, and compute engine 120) may be contained in a common housing (not shown) or in any suitable number of separate housings (not shown).

Processing elements 102 each form execution hardware configured to execute instructions (i.e., software) stored in memory system 104. The processing elements 102 in each processor package may have the same or different architectures and/or instruction sets. For example, the processing elements 102 may include any combination of in-order execution elements, superscalar execution elements, and data parallel execution elements (e.g., GPU execution elements). Each processing element 102 is configured to access and execute instructions stored in memory system 104. The instructions may include a basic input output system (BIOS) or firmware (not shown), an operating system (OS) 132, code 10, compiler 134, GP executable 136, and DP executable 138. Each processing element 102 may execute the instructions in conjunction with or in response to information received from input/output devices 106, display devices 108, peripheral devices 110, network devices 112, and/or compute engine 120.

Host 101 boots and executes OS 132. OS 132 includes instructions executable by the processing elements to manage the components of computer system 100 and provide a set of functions that allow programs to access and use the components. In one embodiment, OS 132 is the Windows operating system. In other embodiments, OS 132 is another operating system suitable for use with computer system 100.

When computer system executes compiler 134 to compile code 10, compiler 134 generates one or more executables—e.g., one or more GP executables 136 and one or more DP executables 138. In other embodiments, compiler 134 may generate one or more GP executables 136 to each include one or more DP executables 138 or may generate one or more DP executables 138 without generating any GP executables 136. GP executables 136 and/or DP executables 138 are generated in response to an invocation of compiler 134 with data parallel extensions to compile all or selected portions of code 10. The invocation may be generated by a programmer or other user of computer system 100, other code in computer system 100, or other code in another computer system (not shown), for example.

GP executable 136 represents a program intended for execution on one or more general purpose processing elements 102 (e.g., central processing units (CPUs)). GP executable 136 includes low level instructions from an instruction set of one or more general purpose processing elements 102.

DP executable 138 represents a data parallel program or algorithm (e.g., a shader) that is intended and optimized for execution on one or more data parallel (DP) optimal compute nodes 121. In one embodiment, DP executable 138 includes DP byte code or some other intermediate representation (IL) that is converted to low level instructions from an instruction set of a DP optimal compute node 121 using a device driver (not shown) prior to being executed on the DP optimal compute node 121. In other embodiments, DP executable 138 includes low level instructions from an instruction set of one or more DP optimal compute nodes 121 where the low level instructions were inserted by compiler 134. Accordingly, GP executable 136 is directly executable by one or more general purpose processors (e.g., CPUs), and DP executable 138 is either directly executable by one or more DP optimal compute nodes 121 or executable by one or more DP optimal compute nodes 121 subsequent to being converted to the low level instructions of the DP optimal compute node 121.

Computer system 100 may execute GP executable 136 using one or more processing elements 102, and computer system 100 may execute DP executable 138 using one or more PEs 122 as described in additional detail below.

Memory system 104 includes any suitable type, number, and configuration of volatile or non-volatile storage devices configured to store instructions and data. The storage devices of memory system 104 represent computer readable storage media that store computer-executable instructions (i.e., software) including OS 132, code 10, compiler 134, GP executable 136, and DP executable 138. The instructions are executable by computer system 100 to perform the functions and methods of OS 132, code 10, compiler 134, GP executable 136, and DP executable 138 as described herein. Memory system 104 stores instructions and data received from processing elements 102, input/output devices 106, display devices 108, peripheral devices 110, network devices 112, and compute engine 120. Memory system 104 provides stored instructions and data to processing elements 102, input/output devices 106, display devices 108, peripheral devices 110, network devices 112, and compute engine 120. Examples of storage devices in memory system 104 include hard disk drives, random access memory (RAM), read only memory (ROM), flash memory drives and cards, and magnetic and optical disks such as CDs and DVDs.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Compute engine 120 is configured to execute DP executable 138. Compute engine 120 includes one or more compute nodes 121. Each compute node 121 is a collection of computational resources that share a memory hierarchy. Each compute node 121 includes a set of one or more PEs 122 and a memory 124 that stores DP executable 138. PEs 122 execute DP executable 138 and store the results generated by DP executable 138 in memory 124. In particular, PEs 122 execute DP executable 138 to apply a map transformation 12 to a set of input indexable types 32 to generate a set of output indexable types 34 as shown in FIG. 4 and described in additional detail above.

A compute node 121 that has one or more computational resources with a hardware architecture that is optimized for data parallel computing (i.e., the execution of DP programs or algorithms) is referred to as a DP optimal compute node 121. Examples of a DP optimal compute node 121 include a node 121 where the set of PEs 122 includes one or more GPUs and a node 121 where the set of PEs 122 includes the set of SIMD units in a general purpose processor package. A compute node 121 that does not have any computational resources with a hardware architecture that is optimized for data parallel computing (e.g., processor packages with only general purpose processing elements 102) is referred to as a non-DP optimal compute node 121. In each compute node 121, memory 124 may be separate from memory system 104 (e.g., GPU memory used by a GPU) or a part of memory system 104 (e.g., memory used by SIMD units in a general purpose processor package).

Host 101 forms a host compute node that is configured to provide DP executable 138 to a compute node 121 for execution and receive results generated by DP executable 138 using interconnections 114. The host compute node includes is a collection of general purpose computational resources (i.e., general purpose processing elements 102) that share a memory hierarchy (i.e., memory system 104). The host compute node may be configured with a symmetric multiprocessing architecture (SMP) and may also be configured to maximize memory locality of memory system 104 using a non-uniform memory access (NUMA) architecture, for example.

OS 132 of the host compute node is configured to execute a DP call site to cause a DP executable 138 to be executed by a DP optimal or non-DP optimal compute node 121. In embodiments where memory 124 is separate from memory system 104, the host compute node causes DP executable 138 and one or more indexable types 14 to be copied from memory system 104 to memory 124. In embodiments where memory system 104 includes memory 124, the host compute node may designate a copy of DP executable 138 and/or one or more indexable types 14 in memory system 104 as memory 124 and/or may copy DP executable 138 and/or one or more indexable types 14 from one part of memory system 104 into another part of memory system 104 that forms memory 124. The copying process between compute node 121 and the host compute node may be a synchronization point unless designated as asynchronous.

The host compute node and each compute node 121 may concurrently execute code independently of one another. The host compute node and each compute node 121 may interact at synchronization points to coordinate node computations.

In one embodiment, compute engine 120 represents a graphics card where one or more graphics processing units (GPUs) include PEs 122 and a memory 124 that is separate from memory system 104. In this embodiment, a driver of the graphics card (not shown) may convert byte code or some other intermediate representation (IL) of DP executable 138 into the instruction set of the GPUs for execution by the PEs 122 of the GPUs.

In another embodiment, compute engine 120 is formed from the combination of one or more GPUs (i.e. PEs 122) that are included in processor packages with one or more general purpose processing elements 102 and a portion of memory system 104 that includes memory 124. In this embodiment, additional software may be provided on computer system 100 to convert byte code or some other intermediate representation (IL) of DP executable 138 into the instruction set of the GPUs in the processor packages.

In further embodiment, compute engine 120 is formed from the combination of one or more SIMD units in one or more of the processor packages that include processing elements 102 and a portion of memory system 104 that includes memory 124. In this embodiment, additional software may be provided on computer system 100 to convert the byte code or some other intermediate representation (IL) of DP executable 138 into the instruction set of the SIMD units in the processor packages.

In yet another embodiment, compute engine 120 is formed from the combination of one or more scalar or vector processing pipelines in one or more of the processor packages that include processing elements 102 and a portion of memory system 104 that includes memory 124. In this embodiment, additional software may be provided on computer system 100 to convert the byte code or some other intermediate representation (IL) of DP executable 138 into the instruction set of the scalar processing pipelines in the processor packages.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer readable storage medium storing computer-executable instructions that, when compiled and executed by a computer system, perform a method comprising:

applying a first data parallel algorithm to a first set of input indexable types to generate a first output indexable type in response to a first map transformation included as an argument in a call site in data parallel source code configured for execution on one or more data parallel compute nodes; and applying a second data parallel algorithm specified by the call site to the first output indexable type to generate a second output indexable type.

2. The computer readable storage medium of claim 1, the method further comprising:
applying the second data parallel algorithm to the first output indexable type and a second set of input indexable types to generate the second output indexable type.

3. The computer readable storage medium of claim 1, the method further comprising:
applying a third data parallel algorithm a second set of input indexable types to generate one of the first set of input indexable types in response to a second map transformation included as the argument in the call site.

4. The computer readable storage medium of claim 1, wherein each of the first set of input indexable types includes a corresponding rank and a corresponding element type.

5. The computer readable storage medium of claim 1, wherein the first map transformation returns the output indexable type using one of by l-value reference, by r-value reference, or by-value.

6. The computer readable storage medium of claim 1, wherein the data parallel source code is written in a high level general purpose programming language with data parallel extensions.

7. The computer readable storage medium of claim 1, wherein the data parallel source code is written in a high level data parallel programming language.

8. The computer readable storage medium of claim 1, wherein the one or more data parallel compute nodes include at least one graphics processing unit.

9. The computer readable storage medium of claim 1, wherein the one or more data parallel compute nodes include at least one general purpose processor.

10. A method performed by a compiler in a computer system, the method comprising:
identifying a first map transformation in data parallel source code configured for execution on one or more data parallel compute nodes; and
generating data parallel executable code from the data parallel source code such that the data parallel executable code implements the first map transformation by applying a first data parallel algorithm to a first set of one or more input indexable types to generate a first output indexable type.

11. The method of claim 10, further comprising:
identifying a second map transformation in the data parallel source code; and
generating the data parallel executable code from the data parallel source code such that the data parallel executable code implements the second map transformation by applying a second data parallel algorithm to a second set of one or more input indexable types that includes the first output indexable type to generate a second output indexable type.

12. The method of claim 10, further comprising:
identifying the first map transformation in a call site in the data parallel source code.

13. The method of claim 12, wherein the first map transformation is an argument in the call site.

14. The method of claim 12, wherein the call site invokes a second data parallel algorithm.

15. The method of claim 10, wherein the data parallel source code is written in a high level general purpose programming language with data parallel extensions.

16. The method of claim 10, wherein the data parallel source code is written in a high level data parallel programming language.

17. The method of claim 10, wherein the one or more data parallel compute nodes include at least one graphics processing unit.

18. The method of claim 10, wherein the one or more data parallel compute nodes include at least one general purpose processor.

19. A computer readable storage medium storing computer-executable instructions that, when executed by a computer system, perform a method comprising:
applying a first data parallel algorithm specified by a call site to a first set of input indexable types to generate a first output indexable type, the call site included in data parallel source code configured for execution on one or more data parallel compute nodes, and each of the first set of input indexable types including a corresponding rank and a corresponding element type; and
applying a second data parallel algorithm to a second set of input indexable types that include the first output indexable type to generate a second output indexable type in response to a first map transformation included in the call site.

20. The computer readable storage medium of claim 19, further comprising:
applying a third data parallel algorithm a second set of input indexable types that includes the second output indexable type to generate a third output indexable type in response to a second map transformation included in the call site.

* * * * *